United States Patent Office 2,703,809
Patented Mar. 8, 1955

2,703,809

7-ACETYL-1,2,3,4,4a,9,10,10a-OCTAHYDRO-1,4a-DIMETHYL-9-OXO-1-PHENANTHRENECARBOXYLIC ACID AND ESTERS THEREOF

Paul F. Ritchie, Wilmington, Del., assignor to Hercules Powder Company, Wilmington, Del., a corporation of Delaware No Drawing. Application July 31, 1953,
Serial No. 371,718

5 Claims. (Cl. 260—469)

This invention relates to new phenanthrenecarboxylic acid derivatives which may be prepared from dehydroabietic acid and, more particularly, to 7-acetyl-octahydro-1,4a-dimethyl-9-oxo-1-phenanthrenecarboxylic acid and esters thereof and the preparation of these compounds.

In accordance with this invention, it has been found that the isopropyl group in the 7-position of the dehydroabietic acid nucleus may be oxidized to the acetyl group and formaldehyde if the carbon in the 9-position of the dehydroabietic acid nucleus has been oxidized to an oxo group. The oxidation of an ester of dehydroabietic acid to produce this 9-oxo-7-acetyl compound may be carried out in a variety of ways as will be shown in the examples set forth below. The free acid may then be prepared by saponification of the ester.

The new compounds of this invention are believed to have the following structural formula:

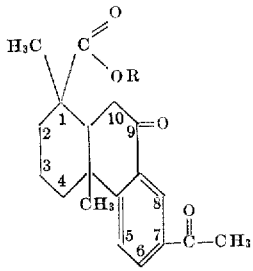

where R may be hydrogen, alkyl, hydroxyalkyl, cycloalkyl, aryl or aralkyl.

In accordance with this invention, esters of 7-acetyl-1,2,3,4,4a,9,10,10a - octahydro - 1,4a - dimethyl - 9-oxo-1-phenanthrenecarboxylic acid may be prepared by oxidizing an ester of 9-oxodehydroabietic acid with a gas containing free oxygen in the presence of a free radical oxidation initiator, whereby the corresponding ester of 14-hydroperoxy-9-oxodehydroabietic acid is produced and then reducing the hydroperoxide group of the latter compound by contacting it with a metallic reducing agent whereby the hydroperoxide group is reduced to a keto group. They are also produced, but in a minor amount, when an ester of dehydroabietic acid is oxidized in the molten state with a gas containing free oxygen in the presence of a metallic salt or is oxidized with chromic acid in acetic acid solution. It is also possible to prepare these esters by the ozonization of an ester of 1,2,3,4,4a,9,-10,10a - octahydro - 7 - isopropenyl - 1,4a - dimethyl - 9-oxo-1-phenanthrenecarboxylic acid.

The following examples will illustrate the preparation of the new compounds of this invention. All parts and percentages are by weight unless otherwise indicated.

Example 1

Ten parts of methyl 9-oxodehydroabietate and 0.500 part of benzoyl peroxide were placed in a reaction vessel provided with a gas inlet tube at the bottom and gas exit tube near the top and the system was flushed out and filled with oxygen. The reaction mixture was liquefied by heating it to 90° C., at which temperature it was held throughout the oxidation. Circulation of oxygen through the reaction mixture was then begun at the rate of 600 ml./min., the oxygen pressure being maintained constant at atmospheric pressure throughout the oxidation. After 25 hours, the amount of oxygen absorbed amounted to 52.9 mole per cent and the oxidate contained 45.0 mole per cent of hydroperoxide.

This oxidate was dissolved in 100 parts of ether. The ethereal solution was then rapidly agitated and mixed with 50 parts of water. To the emulsion thus obtained was slowly added a solution of 5 parts of ferrous sulfate in 50 parts of water. The reaction mixture was agitated for 3 hours at room temperature, after which the ether phase was separated and the aqueous phase was washed with ether. The combined ether solution and washings were then thoroughly washed with water and dried with anhydrous sodium sulfate. On evaporation of ether, 9.5 parts of an oil was obtained.

The oily product was dissolved in 50 parts of benzene and adsorbed on an alumina column. Elution of the column with benzene removed 4.0 parts of unoxidized methyl 9-oxodehydroabietate. The column was then eluted with a 1:1 mixture of benzene and methylene chloride whereby 0.50 part of a product which crystallized from methanol was obtained. The white needles had a melting point of 144°–145° C. The carbon and hydrogen analysis made on a sample of these crystals agreed with that calculated for the methyl ester of 7-acetyl-octahydro-1,4a-dimethyl-9-oxo-1-phenanthrenecarboxylic acid. The crystalline material gave a positive iodoform test and had an ultraviolet absorption spectrum which was consistent with that in which two carbonyl groups are located in positions conjugate to a benzenoid nucleus.

Example 2

Ten parts of methyl 9-oxodehydroabietate was oxidized in the presence of 0.186 part of benzoyl peroxide at 99.3° C. as described in the foregoing example. After 45 hours, the oxygen absorbed amounted to 80.3 mole per cent and the oxidate contained 52 mole per cent of hydroperoxide. This oxidate was dissolved in 100 parts of an aqueous methanol containing 20% of water and the solution was equilibrated against 100 parts of hexane. The aqueous methanol layer was then separated and a fresh portion of hexane was added. A fresh portion of the 20% aqueous methanol was then added to the hexane solution in the first separator. These solutions were again equilibrated and the layers transferred, with fresh portions of solvent added and the solutions equilibrated as before. This procedure was continued until 500 parts of each solvent phase had been brought into use. The hexane layers were combined and the solvent removed to yield a fraction amounting to 2.96 parts and contained 4 mole per cent of hydroperoxide. The aqueous methanol layers were likewise combined and the solvent removed under reduced pressure whereby a fraction amounting to 7.12 parts was obtained which contained 67 mole per cent of hydroperoxide.

A portion of the hydroperoxide-rich fraction (3.55 parts) was dissolved in 50 parts of methanol. To this solution with good agitation was slowly added 4.5 parts of ferrous sulfate in 50 parts of a 1:1 mixture of methanol and water. The addition was carried out over a period of 1.5 hours, after which the temperature of the reaction mixture was raised to 50° C., at which temperature it was agitated for 1 hour. The mixture was then poured into several volumes of water and the product extracted with ether. The ethereal solution was washed, dried in contact with anhydrous sodium sulfate, and finally evaporated to remove the ether. This product (3.17 parts) was dissolved in 35 parts of a 2:1 mixture of hexane and benzene and the solution was adsorbed on an alumina column. Elution of the column with hexane-benzene mixtures of various compositions and with benzene alone removed 0.39 part of material. The column was then eluted with 500 parts of methylene chloride whereby 0.20 part of a material which crystallized in fine white needles from cold methanol was obtained. These crystals had a melting point of 142°–144° C. The product was found to be the same as that obtained in Example 1.

Example 3

Ten parts of methyl 9-oxodehydroabietate was oxidized in the presence of 0.750 part of benzoyl peroxide at 90° C. by the procedure described in Example 1. After 24 hours, the oxygen absorbed amounted to 56.1 mole per cent and the oxidate was found to contain 35 mole per cent of hydroperoxide. This product was dissolved in 400 parts of methanol and the hydroperoxide was decomposed by the slow addition of 10 parts of ferrous sulfate dissolved in 200 parts of a 1:1 mixture of methanol and water as described in the foregoing example, the addition of the ferrous sulfate solution taking 2 hours. The reaction mixture was then heated and agitated for 2 hours at reflux temperature. The reaction mixture was poured into several volumes of water and the product extracted with ether. The product was recovered from the ethereal solution and then adsorbed on an alumina column. Elution of the column with benzene removed 3.9 parts of unchanged methyl 9-oxodehydroabietate. The column was then eluted with methylene chloride whereby 0.75 part of a material was obtained which could be crystallized from cold methanol. The crystals had a melting point of 144°–145° C. and were the same as those obtained in Example 1.

*Example 4*

Methyl dehydroabietate (31.4 parts) and 0.31 part of a hydrocarbon solution containing 6% of cobalt naphthenate were placed in a reaction vessel provided with an agitator, a gas inlet tube at the bottom and a gas exit tube near the top and the system was flushed out and filled with oxygen. The reaction mixture was liquefied by heating it to 80° C., at which temperature it was held throughout the oxidation. Circulation of oxygen through the reaction mixture was then begun, the oxygen pressure being maintained constant at atmospheric pressure throughout the oxidation. At the end of 24 hours, the absorption of oxygen amounted to 130 mole per cent. The product was dissolved in ether and the ethereal solution was washed first with 1% aqueous sodium hydroxide, then with 5% aqueous hydrochloric acid, and finally with water. The ethereal solution was dried with anhydrous sodium sulfate and the product was recovered by removal of the ether.

The oxidate so obtained was dissolved in 150 parts of methylene chlorine and adsorbed on an alumina column. On elution of the column with 4000 parts of methylene chloride, 12.9 parts of a material consisting chiefly of methyl 9-oxodehydroabietate and methyl 9-hydroxydehydroabietate was obtained. Further elution of the column with 1500 parts of methylene chloride removed 3.1 parts of a material which, when extracted with isooctane, yielded 1.2 parts of an insoluble material which, when dissolved in methanol and cooled, crystallized in fine white needles having a melting point of 143°–144° C. A mixed melting point taken on this product with the product obtained in Example 1 showed no depression in the melting point, proving that it was the methyl ether of 7-acetyl-octahydro-1,4a- dimethyl-9-oxo-1-phenanthrenecarboxylic acid.

*Example 5*

Methyl dehydroabietate (157 parts) was dissolved in 1700 parts of glacial acetic acid. The solution was agitated and heated to 49°–50° C., at which temperature a solution of 66.7 parts of chromic oxide in 100 parts of water and 300 parts of glacial acetic acid was added during a period of 4 hours. The temperature was then allowed to drop to room temperature and agitation was continued for 16 hours. The reaction mixture was then poured into several volumes of water and the product recovered by extraction with ether. The ethereal solution was washed with water, 1% sodium hydroxide solution, again with water, and finally was dried and the ether removed from it by evaporation. Seventy-five parts of this product was then dissolved in hexane and adsorbed on an alumina column. The column was exhaustively eluted in succession by hexane and benzene, after which it was eluted with a 4:1 mixture of benzene and methylene chloride, whereby 4.9 parts of a material was obtained. From this latter material, on crystallization from methanol, there was obtained 0.7 part of fine white needles which had a melting point of 142°–143° C. No depression in the melting point was observed on admixture of these crystals with those obtained by the process of Example 1, thus showing the product to be the methyl ester of 7-acetal - octahydro-1,4a-dimethyl-9-oxo-1-phenanthrenecarboxylic acid.

*Example 6*

To a solution of 4.3 parts of the methyl ester of 7-acetal - octahydro-1,4a-dimethyl-9-oxo-1-phenanthrenecarboxylic acid in 150 parts of ethanol was added 1.5 parts of potassium hydroxide dissolved in 50 parts of water. The solution was then refluxed for 7 hours in an atmosphere of nitrogen, after which it was diluted with water and extracted with ether. The aqueous alkaline phase was acidified with acetic acid and extracted with ether. This latter ether extract was washed with water until neutral, dried in contact with anhydrous sodium sulfate and evaporated to dryness. The product, 3.4 parts, was crystallized from benzene and then recrystallized twice from aqueous methanol to obtain a product having a constant melting point of 189°–190° C. The carbon and hydrogen analysis made on a sample of these crystals agreed with that calculated for the free acid, 7-acetyl-octahydro-1,4a-dimethyl-9-oxo-1-phenanthrenecarboxylic acid. The product had a neutral equivalent of 312 which was in agreement with the caluculated value (314).

As shown by the foregoing examples, the new esters of this invention, the esters of 7-acetyl-1,2,3,4,4a,9,10,10a-octahydro-1,4a-dimethyl-9-oxo-1-phenanthrenecarboxylic acid, may be prepared by subjecting an ester of 14-hydroperoxy-9-oxodehydroabietic acid to the action of a metallic reducing agent whereby the hydroperoxide radical is reduced to a keto group and formaldehyde is evolved as a by-product. The 14-hydroperoxy-9-oxodehydroabietic acid esters are obtained by the liquid phase oxidation of 9-oxodehydroabietic acid esters with oxygen or an oxygen-containing gas, preferably in the presence of a free radical oxidation initiator.

The esters of 9-oxodehydroabietic acid from which the 14-hydroperoxy compound is prepared are obtained by the oxidation of the corresponding ester of dehydroabietic acid. This oxidation may be carried out in a variety of ways, as, for example, oxidizing the ester in the molten state with an oxygen-containing gas in the presence of a metallic salt or by the oxidation in liquid phase with an oxygen-containing gas in the presence of a free radical oxidation initiator with the subsequent reduction of the 9-hydroperoxydehydroabietate, so produced, to the 9-oxo compound.

The first of these methods of oxidizing esters of dehydroabietic acid, that is, the metal catalyzed oxidation process, is carried out by passing an oxygen-containing gas through the ester in the molten state in the presence of a metallic compound. The temperature at which the oxidation is carried out must be at least that of the melting point of the ester being oxidized, as, for example, a temperature above about 62° C. in the case of methyl dehydroabietate, 30° C. in the case of ethyl dehydroabietate, 104° C. in the case of the glycerol ester of dehydroabietic acid, etc. In general, a temperature at which the oxidation of the alkyl dehydroabietate is carried out is from above the melting point of the ester to about 125° C., and preferably between about 65° C. and 100° C. Any compound of a metal capable of existing in more than one valence state may be used to catalyze this oxidation reaction provided that the metallic compound is at least slightly soluble in the reaction mixture. Of particular value are those metallic salts which are soluble in organic solvents and may then be added to or dissolved in the molten ester in the form of a solution of the metallic salt in an inert organic solvent. Exemplary of the metallic compounds which may be used are such salts as the chlorides, acetates, stearates, naphthenates, resinates, etc., of such metals as cobalt, iron, nickel, palladium, copper, cadmium, mercury, aluminum, tin, chromium, molybdenum, manganase, etc. Any amount of the metallic salt may be used but in general, it will vary from a catalytic amount to about 5% based on the weight of the ester. The oxidation should be carried out until at least 1 mole of oxygen per mole of ester has been absorbed since at lower oxygen absorptions the oxidate is a mixture of the 9-oxo- and 9-hydroxy-dehydroabietates and unoxidized ester. At oxygen absorptions of 1 mole of oxygen per mole of ester, or higher, the oxidate is chiefly the 9-oxo compound and in addition contains small amounts of 14-hydroxy-9-oxodehydroabietate and the ester of 7-acetal-octahydro-1,4a- dimethyl-9-oxo-1-phenanthrenecarboxylic acid, the amounts of these latter products being dependent upon the total degree of oxidation. The 9-oxodehydroabietate may then be separated from the reaction mixture by countercurrent extraction with two immiscible solvents or by chromatographing the reaction mixture on alumina.

As already pointed out, esters of 9-oxodehydroabietic acid may also be prepared by the oxidation of an ester of dehydroabietic acid in liquid phase with oxygen and then reducing the hydroperoxide so obtained to the ketone. This oxidation process is most readily carried out by passing an oxygen-containing gas through the ester in the liquid state, that is, either molten or dissolved in an inert solvent. Any gas containing free oxygen may be used for carrying out the oxidation, as, for example, molecular oxygen or air. The temperature at which the oxidation is carried out will depend upon the reaction conditions. For example, if it is carried out in the absence of a solvent, the temperature must be at least that of the melting point of the ester being oxidized, as, for example, above about 62° C. in the case of methyl dehydroabietate, 30° C. in the case of ethyl dehydroabietate, etc. If a solution of the ester is used, as, for example, tert-butyl benzene, lower temperatures may be used for the oxidation. In general, the oxidation is carried out at a temperature between about 60° C. and 130° C., and preferably between about 65° C. and about 100° C. This oxidation is preferably carried out in the presence of a free radical oxidation initiator, i. e., a material which undergoes thermal decomposition to form free radicals under the reaction conditions. Of particular value are the peroxidic free radical oxidation initiators such as organic peroxides and organic hydroperoxides which form free radicals under the reaction conditions. Exemplary of the peroxidic compounds which may be used are acetyl peroxide, benzoyl peroxide, tert-butyl peroxide, methyl ethyl peroxide, tert-butyl hydroperoxide, α,α-dimethylbenzyl hydroperoxide, napthene hydroperoxides, etc. The oxidate so obtained and containing the ester of 9-hydroperoxydehydroabietic acid is then subjected to reduction with a metallic reducing agent to produce the 9-oxodehydroabietate. Any metallic compound containing a metallic atom which is capable of acting as a reducing agent, i. e., which exists in more than one valence state and is in one of its lower valence states and is capable of being oxidized to one of its higher valence states, may be employed. Exemplary of such metallic reducing agents are the sulfates, nitrates, chlorides, naphthenates, acetates, etc., of iron, cobalt, nickel, manganese, chromium, tin, lead, mercury, copper, etc., wherein the metallic ion is in one of its lower oxidation states. The metallic reducing agent is preferably one which is water-soluble. The reduction is most easily carried out by adding a solution of the metallic reducing agent to a solution of the 9-hydroperoxydehydroabietate in an inert solvent which is preferably one in which ionization is possible. Solvents which may be used for this purpose are aqueous alcohol, acetone, dioxane, etc. The esters of 9-oxodehydroabietic acid are then obtained from the reduction reaction mixture by pouring the latter into water and extracting the organic product by means of ether or some other water-immiscible solvent.

The esters of 14-hydroperoxy-9-oxodehydroabietic acid which are then reduced to produce the products of this invention may be prepared by the oxidation of the 9-oxodehydroabietate with an oxygen-containing gas in the presence of a free radical oxidation initiator in the same manner as that described above for the preparation of esters of 9-hydroperoxydehydroabietic acid. In the event that the oxidation is carried out on the molten ester, the temperature at which the oxidation is carried out must also be above the melting point of the ester, that is, for example, above about 68° C. in the case of methyl 9-oxodehydroabietate, etc.

The 7-acetyl compound is then prepared from the 14-hydroperoxide by contacting the latter compound with a metallic reducing agent. By the term "metallic reducing agent" is meant any metallic compound containing a metallic atom which is capable of acting as a reducing agent, that is, which exists in more than one valence state and is in one of its lower valence states and is capable of being oxidized to one of its higher valence states. Exemplary of the metallic reducing agents which may be used are the salts such as the sulfates, nitrates, chlorides, naphthenates, acetates, etc., of iron, cobalt, nickel, manganese, chromium, tin, lead, mercury, copper, etc., wherein the metallic ion is in one of its lower oxidation states.

The reduction of the 14-hydroperoxide compound or the oxidate containing this hydroperoxide is preferably carried out in solution. Any inert solvent may be used for carrying out the reduction reaction but is preferably a polar solvent, that is, one in which ionization is possible. Any solvent in which both the hydroperoxide and reducing agent are soluble may be used, as, for example, aqueous methanol, ethanol, propanol, isopropanol, acetone, dioxane, etc. The reaction may also be carried out in a two-phase system, the hydroperoxide being dissolved in a solvent for it, such as diethyl ether, and this solution then intimately contacted with an aqueous solution of the reducing agent. The amount of solvent used may be varied over a wide range but should be sufficient to insure that the reaction mixture is homogeneous. Usually the hydroperoxide is dissolved in an amount of solvent to obtain a solution of about 1% to about 10% concentration.

The amount of reducing agent used in the process of this invention to obtain the ketone from the hydroperoxide may be varied over a wide range, but preferably is an amount sufficient to provide one electron for each hydroperoxy radical to be reduced to the keto radical. Greater amounts of the reducing agent may be added if desired but are, of course, not necessary. The temperature at which the reduction reaction is carried out will depend upon the reducing agent being used, the solvent, etc. In general, a temperature of from about 0° C. to about 100° C., and preferably from about 20° C. to about 100° C., is used.

As pointed out above and illustrated in Examples 4 and 5, the esters of 7-acetyl-octahydro-1,4a-dimethyl-9-oxo-1-phenanthrenecarboxylic acid are also obtained, but in a minor amount, when an ester of dehydroabietic acid is oxidized with air in the presence of a metallic catalyst or with chromic acid. To produce significant amounts of the ester by the first of these oxidations, the oxidation should be carried out until an oxygen absorption of from 1 to 2 moles of oxygen per mole of ester has been obtained. In the same way to produce significant amounts of the diketone in the chromic acid oxidation, more than 1 mole of chromic acid should be used per mole of ester. The ester of this diketone may also be produced by the ozonization of the ester of octahydro-7-isopropenyl-1,4a-dimethyl - 9 - oxo-1-phenanthrenecarboxylic acid, which product is obtained by the dehydration of an ester of 14-hydroxy-9-oxodehydroabietic acid.

While the foregoing examples have shown the preparation of the methyl ester of 7-acetyl-octahydro-1,4a-dimethyl-9-oxo-1-phenanthrenecarboxylic acid, any other alkyl, hydroxyalkyl, cycloalkyl, aryl, or aralkyl ester may be prepared in like manner. For example, ethyl, propyl, butyl, hydroxyethyl, glycerol, cyclohexyl, benzyl, etc., dehydroabietates may be oxidized with an oxygen-containing gas in the presence of a metallic compound or the 9-oxo derivatives of these esters may be oxidized in the presence of a peroxide catalyst to product the 14-hydroperoxide which may then be reduced with a metallic reducing agent to yield the desired ester.

The free acid, 7-acetyl-1,2,3,4,4a, 9, 10, 10a-octahydro-1,4a-dimethyl-9-oxo - 1 - phenanthrenecarboxylic acid is readily obtained from an alkyl ester thereof by saponification. Any of the usual methods of carrying out the saponification normally employed in the preparation of an acid from an ester may be used.

The new products of this invention are diketones containing a carboxylic acid group and as such are valuable intermediates in the synthesis of other products, particularly in the synthesis of pharmaceutical materials. In addition, they have many other valuable properties. For example, they have the unique property of acting as latent crystalline plasticizers for neoprene adhesive compositions. As is well-known, delayed tack adhesives are desired in many adhesive applications. For example, in the blocking of labels, delayed tack adhesives are desired to prevent the adhesive on the back of the label from becoming sticky and the labels sticking together. By using delayed tack adhesives, the label backing is dry and free of tack until it is fused just prior to placement of the label on the container. The esters of 7-acetyl-octahydro-1,4a-dimethyl-9-oxo-1-phenanthrenecarboxylic acid are excellent tack-delaying plasticizers for neoprene adhesives having the property of remaining in crystalline, discrete particles when mixed with the neoprene but of being substantially compatible or soluble in the neoprene when melted or heated together. To demonstrate the effectiveness of methyl 7-acetyl-octahydro-1,4a-dimethyl-9-oxo-1-phenanthrenecarboxylate in this use, films were cast from solutions of neoprene in toluene wherein the ratio of neoprene to this ester was 4:1, 8:1 and 16:1, respectively. After drying, the film in each case was not tacky and showed evidence of crystallization of the 7-acetyl compound. When the films were warmed slightly, the 7-acetyl compound fused into the neoprene and the films became tacky. After again cooling to room temperature, they remained tacky for a period of 48 hours without any sign of crystallization. Thus, the methyl ester of 7-acetyl-octahydro-1,4a-dimethyl-9-oxo-1 - phenanthrenecarboxylic acid is outstanding for use in neoprene delayed tack adhesives.

The new esters of this invention are also useful as plasticizers in other types of plasticized materials. For example, a mixture of vinyl acetate and the methyl ester of 7 - acetyl-octahydro - 1,4a-dimethyl-9-oxo-1-phenanthrenecarboxylic acid was completely compatible at a ratio of 8:1 and when cast from a solution in toluene, the film so obtained was perfectly clear and after drying was much more pliable than the film cast from a solution containing none of the 7-acetyl compound. The same results were obtained when this methyl ester was mixed with a lacquer grade nitrocellulose (viscosity of ½ sec.) at a ratio of 8:1. It is also an effective plasticizer for cellulose acetate, demonstrating a good plasticizing action at a ratio of 1 part of the 7-acetyl compound to 16 parts of cellulose acetate. Thus, the new esters of this invention may be used as plasticizers for various plastics and film-forming materials.

This application is a continuation-in-part of my application Serial No. 251,251, filed October 13, 1951, now abandoned.

What I claim and desire to protect by Letters Patent is:

1. A phenanthrenecarboxylic acid derivative selected from the group consisting of 7-acetyl-1,2,3,4,4a,9,10,10a-octahydro - 1,4a-dimethyl-9-oxo-1-phenanthrenecarboxylic acid and esters thereof.

2. 7 - Acetyl - 1,2,3,4,4a,9,10,10a - octahydro - 1,4a-dimethyl-9-oxo-1-phenanthrenecarboxylic acid.

3. An ester of 7-acetyl-1,2,3,4,4a,9,10,10a-octahydro-1,4a-dimethyl-9-oxo-1-phenanthrenecarboxylic acid.

4. An alkyl ester of 7-acetyl-1,2,3,4,4a,9,10,10a-octahydro - 1,4a - dimethyl - 9 - oxo-1-phenanthrenecarboxylic acid.

5. The methyl ester of 7-acetyl-1,2,3,4,4a,9,10,10a-octahydro - 1,4a-dimethyl-9-oxo-1-phenanthrenecarboxylic acid.

References Cited in the file of this patent

Kharasch et al.: J. Org. Chem. 15, 763; 770 (1950).

UNITED STATES PATENT OFFICE

CERTIFICATE OF CORRECTION

Patent No. 2,703,809

March 8, 1955

Paul F. Ritchie

It is hereby certified that error appears in the printed specification of the above numbered patent requiring correction and that the said Letters Patent should read as corrected below.

Column 3, line 41, for "chlorine" read -- chloride --; line 53, for "ether" read -- ester --; column 3, line 82, and column 4, lines 1 and 79, for "7-acetal", each occurrence, read -- 7-acetyl --; same column 4, line 18, for "caluculated" read -- calculated --; column 6, line 56, for "product" read -- produce --.

Signed and sealed this 12th day of April, 1955.

(SEAL)
Attest:

E. J. MURRY

Attesting Officer

ROBERT C. WATSON
Commissioner of Patents